US012291051B2

(12) United States Patent
Kilbo et al.

(10) Patent No.: US 12,291,051 B2
(45) Date of Patent: May 6, 2025

(54) DEINKING OF PRINTED SUBSTRATES

(71) Applicant: SIEGWERK DRUCKFARBEN AG & CO. KGAA, Siegburg (DE)

(72) Inventors: John Kilbo, Morganton, NC (US); Eric Davis, Des Moines, IA (US); Holger Bergman, Windeck (DE); Sebastian Kenter, Neunkirchen-Seelscheid (DE); Ralf Leineweber, Siegburg (DE)

(73) Assignee: Siegwerk Druckfarben AG & Co. KGaA, Siegburg (DE)

( * ) Notice: Subject to any disclaimer, the term of this patent is extended or adjusted under 35 U.S.C. 154(b) by 262 days.

(21) Appl. No.: 17/800,798

(22) PCT Filed: Feb. 8, 2021

(86) PCT No.: PCT/EP2021/052948
§ 371 (c)(1),
(2) Date: Aug. 18, 2022

(87) PCT Pub. No.: WO2021/165081
PCT Pub. Date: Aug. 26, 2021

(65) Prior Publication Data
US 2023/0097817 A1 Mar. 30, 2023

Related U.S. Application Data

(60) Provisional application No. 62/978,341, filed on Feb. 19, 2020.

(51) Int. Cl.
B41M 7/00 (2006.01)
(52) U.S. Cl.
CPC .......... B41M 7/0009 (2013.01); B41M 7/009 (2013.01); B41M 2205/18 (2013.01)

(58) Field of Classification Search
CPC .......... B41M 7/0009; B41M 7/009; B41M 2205/18; B41M 5/0011; D21C 5/025; D21C 5/027; Y02W 30/64
See application file for complete search history.

(56) References Cited

U.S. PATENT DOCUMENTS

| 2007/0158039 A1 | 7/2007 | Rosencrance et al. |
| 2012/0276619 A1 | 11/2012 | Yamamoto et al. |
| 2015/0298360 A1 | 10/2015 | Fullana Font et al. |

FOREIGN PATENT DOCUMENTS

| JP | 2001-131484 A | 5/2001 |
| JP | 2004139067 A * | 5/2004 |

(Continued)

OTHER PUBLICATIONS

English translated description of JP2004139067A retrieved from Espacenet on May 18, 2024 (Year: 2024).*

(Continued)

Primary Examiner — Jacob T Minskey
Assistant Examiner — Elisa H Vera
(74) Attorney, Agent, or Firm — Finch & Maloney PLLC

(57) ABSTRACT

The present invention is related to a deinking primer composition for deinking of a substrate, wherein said deinking primer composition comprises a binder component that has a polymeric backbone with pendent hydroxy or carboxy groups that have been esterified or acetalised or ketalised to such an extent that the binder component has an acid value of 0-50 mg KOH/g or a hydroxyl value of 0-600 mg KOH/g, preferably 0-400 mg KOH/g, so that a primer layer prepared from said deinking primer composition is dissolvable in an alkaline aqueous medium.

14 Claims, 3 Drawing Sheets

(56) References Cited

FOREIGN PATENT DOCUMENTS

JP            6-388131 B2     9/2018
WO           94/01614 A2     1/1994

OTHER PUBLICATIONS

English translated description of JP6388131B2 retrieved from Espacenet on May 18, 2024 (Year: 2024).*
International Search Report Corresponding to PCT/EP2021/052948 mailed May 25, 2021.
Written Opinion Corresponding to PCT/EP2021/052948 mailed May 25, 2021.

\* cited by examiner

DEINKING OF PRINTED SUBSTRATES

The present invention is related to the deinking of substrates, such as flexible packaging articles.

Due to increasing environmental concerns, the conventional approach of throwing away articles after use has to be replaced by approaches involving the recycling of the articles or materials making up those articles.

This applies especially to plastic articles. Articles made of plastic (i.e. synthetic polymers such as polyethylene (PE), polypropylene (PP) or polyethylene terephthalate (PET)) are extremely efficient for the purposes of flexible packaging. However, this advantage has led to an extreme use of plastic materials, and without efficient recycling the environmental pollution that can already be observed (e.g. pollution of the oceans) will increase. This includes increase health hazards due to micro-plastic waste entering into the environment. Moreover, the plastic waste is landfilled with the high risk of leaking into nature.

Unrecycled plastic material is currently largely incinerated, which is detrimental with respect to the amount of $CO_2$ released therewith and its contribution to global warming.

In some regions (e.g. the EU) regulations have been implemented requiring a certain recycling rate to be obtained until a certain point in time. Furthermore and independent from regulations, all major brand owners made commitments to increase the amount of recycled material in their products.

Accordingly, there is a need for efficient recycling concepts for plastic material.

With respect to printed articles, this imposes additional requirements. The recyclability of material and quality of recycled material should not be impaired by the printing inks applied thereupon. Extremely critical in this respect is the extrusion step where the material is processed at higher temperatures resulting in a deterioration of the recycled product quality due to the limited heat resistance of binders and/or pigments present in the printing ink layer. Furthermore, caused by the pigment in the printed layer, the recycled material is coloured and not transparent, which limits the area of application.

Accordingly, before recycling of plastic articles such as flexible packaging products, it is necessary to remove the ink and/or lacquer layer.

In US-2015/298 360 A1, a method for removing ink printed on a plastic film is described, wherein a printed material is first conditioned in a plunger in order to obtain a film free of impurities, and subsequently said film is ground and subjected to cleaning and washing steps using a cleaning system with a cleaning solution consisting of surfactants in water at basic pH. The method states to allow recovery of the cleaned film, the cleaning solution as well as of the pigments of the ink layer that was applied onto the film. While this method may be suitable on a lab scale, it is difficult to implement in an upscaled commercial process.

In JP-2001/131484, a plastic film was described from which printed matters can be easily released and removed by a treatment with an aqueous solution when recycled, due to the provision of a releasing layer on its surface, on which releasing layer a printed matter is formed. The releasing layer is made of a material which becomes water-swellable or water-soluble by at least a neutralization treatment. The releasing layer comprises a releasing component which is a polymer or a copolymer containing 10-60 wt. % of a carboxylic group in the molecule. During the neutralisation treatment, the carboxylic groups of said component are converted into the respective carboxylate groups, which renders the releasing layer water soluble.

However, such releasing layers do not meet the requirement imposed on commercial plastic articles such as flexible packagings. In particular, they do not exhibit the necessary water sensitivity, so that on the one hand they are sufficiently water-resistant under normal conditions of use, but on the other hand dissolve sufficiently quickly (in less than 15 minutes) and to such an extent that the substrate from which the layer is released is sufficiently pure. Another aspect is the poor overprintability of such layers, resulting in problems like pinholes and unacceptable print quality.

It was the problem of the present invention to provide a possibility of improved deinking of printed articles.

The above problem is solved by the present invention.

In detail, the present invention is related to a deinking primer composition for deinking of a substrate, wherein said deinking primer composition comprises a binder component that has a polymeric backbone with pendent hydroxy or carboxy groups that have been esterified or acetalised or ketalised to such an extent that the binder component has an acid value of 0-50 mg KOH/g or a hydroxyl value of 0-600 mg KOH/g, preferably 0-400 mg KOH/g, so that a primer layer prepared from said deinking primer composition is dissolvable in an alkaline aqueous medium.

The terms "primer composition" and "primer layer" are known in the art and refer to a composition or layer made therefrom which is applied onto a surface of a substrate in order to provide said surface with the required properties for applying a printing layer thereupon. These required properties comprise, for example, good adhesion properties, so that the printing ink layer applied thereupon does not detach during normal operation conditions. Moreover, these required properties can, depending on the substrate, comprise sufficient smoothness so that a printing ink layer applied thereupon shows the desired gloss. In accordance with the present invention, a deinking primer composition is a specific primer composition that renders a primer layer made therefrom suitable for deinking. This involves characteristics such as very good solubility in an alkaline aqueous medium in combination with very good overprintability and water resistance.

According to the present invention, it was found that binder components which are too water-soluble (e.g. due to a very high content of free carboxylic acid groups, i.e. a high acid value like the binders described in JP-2001/131484) are not suitable as deinking primer compositions, since they do not meet the required criteria of overprintability and water resistance. Surprisingly, the deinking primer compositions of the present invention provide an excellent balance between solubility in an alkaline aqueous medium and required good overprintability and water resistance.

A primer layer consists of one or more binder components, one or more solvents, and optionally additives such as waxes, plasticisers and adhesion promoters. A deinking primer composition according to the present invention does not comprise any colorant.

According to one preferred embodiment of the present invention, the pendent hydroxy or carboxy groups are esterified under formation of water-degradable bonds. The term "water-degradable bond" designates a chemical bond that become hydrolysed in an alkaline aqueous medium having a pH value from more than 7 to 14, more preferably 7.5 to 12.5, at an elevated temperature of between 50 to 90° C., preferably 60 to 85° C., within a period of time in the range between 0 to 15 minutes, preferably 1 to 10 minutes, especially preferable 2 to 6 minutes. According to a particular preferred embodiment of the present invention, the deinking primer compositions described herein contain water-degradable bonds to such an extent that a primer layer made therefrom and being printed thereupon with a conventional UV or SB (solvent-based) ink is dissolved in aqueous 1% NaOH medium at 65° C. in 10 minutes or less, preferably in 7 minutes or less, more preferably in 5 minutes or less, and especially preferred in 3 minutes or less.

It has been surprisingly found that a primer layer made from the above deinking primer composition comprises, on the one hand, good overprintability and sufficient stability (i.e. water resistance) under normal conditions of use, but on the other hand dissolve sufficiently quickly (in less than 15 minutes) and to such an extent that the substrate from which the layer is released is properly pure for recycling.

The acid value is a known parameter that defines the number of free carboxylic acid groups in a chemical compound. It is typically determined by a titration of the substance to be examined with KOH. The amount of KOH (in mg) required for neutralisation of 1 g of the substance to be examined is the acid value.

The hydroxyl value is a known parameter that defines the number of free hydroxy groups in a chemical compound. It is also typically expressed by the amount of KOH (in mg) equivalent to the number of hydroxy groups in 1 g of the substance to be examined. It may be determined, for example, by acetylation of the free hydroxy groups of a substance with acetic anhydride. After completion of the reaction, water is added, and the remaining unreacted acetic anhydride is converted to acetic acid and measured by titration with potassium hydroxide.

The binder components of the deinking primer composition of the present invention are characterized by a polymeric backbone with pendent hydroxy or carboxy groups that have been esterified, acetalised or ketalised. In other words, the backbone comprises side chains in which said ester bonds or acetal moieties or ketal moieties are present. Those side chains may be formed by hydroxy or carboxy groups directly attached to the backbone and being esterified, acetalised or ketalised by respective reaction partners such as carboxylic acids or alcohols, aldehydes or ketones. Alternatively, to the backbone of the binder components there may be attached side chains which at least at one position, preferably at their terminal end, may comprise hydroxy or carboxy groups being esterified, acetalised or ketalised by respective reaction partners such as carboxylic acids or alcohols, aldehydes or ketones. The backbone itself is preferably made of carbon-carbon bonds, but may also comprise hetero bonds.

According to a preferred embodiment of the present invention, said binder component that is comprised in the deinking primer composition has a polymeric backbone with water-degradable bonds in the form of pendent hydroxy or carboxy groups that have been esterified, i.e. it is a polyester, preferably selected from the group consisting of polyvinyl esters and polyacrylates.

Polyvinyl esters and their synthesis are known in the art. Generally, they are composed of vinyl alcohol units that are polymerised by a radical polymerisation mechanism, and wherein the hydroxy groups of the vinyl alcohol units have been converted into respective ester units. Preferably, the polyvinyl esters according to the present invention are defined by the following formula

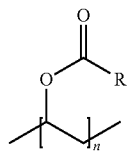

wherein
R is a linear or branched $C_{1-10}$ alkyl residue, preferably, $CH_3$, $C_2H_5$, $C_3H_7$, and $C_4H_9$, and
n is an integer from 10 to 100, preferably, 10 to 50.

According to the present invention, preferred polyvinyl esters are polyvinyl acetate, polyvinyl propionate, and polyvinyl butyrate. The polyvinyl esters to be used in the present invention may be fully esterified or esterified to such an extent that they have a hydroxyl value of 0-400 mg KOH/g.

According to a preferred embodiment of the present invention, the polyvinyl esters may be at least partially hydrolysed under the deinking conditions of the present invention described below.

Polyvinyl esters that are suitable for the deinking primer composition of the present invention are commercially available. Examples are Vinnapas (Polyvinyl acetate) and Elvanol, Poval and Excerval (partly hydrolysed polyvinyl acetate).

Polyacrylates are known in the art. Generally, polyacrylates are composed of acrylic acid or methacrylic acid units that are polymerised by a radical polymerisation mechanism, and wherein the carboxyl groups of the acrylic acid or methacrylic acid units have been at least partially converted into respective ester units. Preferably, the polyacrylates according to the present invention are defined by the following formula

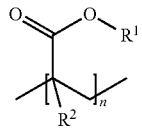

wherein
$R^1$ is a linear or branched $C_{1-10}$ alkyl residue, preferably, $CH_3$, $C_2H_5$, $C_3H_7$, and $C_4H_9$, and combinations thereof,
R2 is H or $CH_3$, and
n is an integer from 10 to 100, preferably, 10 to 50.

According to the present invention, also copolymers of acrylates or methacrylates with other monomers may be suitable. As an example, a styrene-acrylate copolymer may be mentioned whose free carboxylic acid groups have at least been partially esterified.

The polyacrylates to be used in the present invention may be fully esterified or esterified to such an extent that they have an acid value of 0-50 mg KOH/g.

Polyesters that are suitable for the deinking primer composition of the present invention are commercially available. Examples are Degalan, Neocryl, Dianal, Elvacite, or PChem.

According to another preferred embodiment of the present invention, said binder component that is comprised in the deinking primer composition has a polymeric backbone with pendent hydroxy groups that have been acetalised or ketalised, i.e. it is an acetal or ketal.

Acetals and ketals are commonly prepared by reaction of an aldehyde or a ketone with hydroxy-containing molecules. Preferably, said hydroxy-containing molecule is a polyvinyl alcohol. Upon reaction with an aldehyde or ketone, respective acetals or ketals are formed. Preferably, the acetals or ketals according to the present invention are defined by the following formula

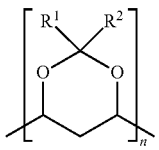

wherein
$R^1$ is a linear or branched $C_{1-10}$ alkyl residue, preferably $CH_3$, $C_2H_5$, $C_3H_7$, and $C_4H_9$,
R2 is H or a linear or branched $C_{1-10}$ alkyl residue, preferably $CH_3$, $C_2H_5$, $C_3H_7$, and $C_4H_9$, and
n is an integer from 10 to 100, preferably, 10 to 50.

Preferred examples are acetals where $R^1$=H and $R^2$=H; $R^1$=$CH_3$ and $R^2$=H; $R^1$=$C_2H_5$ and $R^2$=H; or $R^1$=$C_3H_7$; $R^2$=H. the latter compound is also known under the name polyvinyl butyral (commercially available under the trade name Mowital).

These compounds are typically not water-degradable. According to the invention, they therefore have a hydroxyl value of 50-600 mg KOH/g, preferably 100-400 mg KOH/g and especially preferred 200 to 400 mg KOH/g, in order to exhibit the required solubility in alkaline aqueous medium having a pH value from more than 7 to 14, more preferably 7.5 to 12.5, at an elevated temperature of between 50 to 90° C., preferably 60 to 85° C., within a period of time in the range between 0 to 15 minutes, preferably 1 to 10 minutes, especially preferable 2 to 6 minutes.

The deinking primer composition according to the present invention may further comprise at least one additional binder component. Said additional binder component does not have to be water-degradable. However, in order to provide the necessary water-degradability of the primer layer made from said primer composition, said binder component that comprises water-degradable bonds should be present in an amount from 5 to 20 wt.-%, preferably 7 to 15 wt.-%, based on the weight of the entire primer composition.

Any binder components conventionally used in primer compositions may be used as additional binder component. Examples are nitrocellulose, polyesters, ketonic resins, maleic resins or polyurethanes. Preferably, the primer composition of the present invention comprises 10 to 40 wt.-%, more preferably 20 to 30 wt.-%, based on the weight of the entire primer composition, of said at least one additional binder component.

The primer composition according to the present invention further comprises at least one solvent. The solvent may be water or an organic solvent. Any organic solvent that is conventionally used in a primer or printing inks compositions may be used. Examples are esters such as ethyl acetate, n-propyl acetate, isopropyl acetate, or neopentyl acetate, or alcohols such as ethanol, n-propanol or isopropanol. Preferably, the primer composition of the present invention comprises 40 to 85 wt.-%, more preferably 50 to 70 wt.-%, based on the weight of the entire primer composition, of said at least one solvent.

The primer composition according to the present invention may further comprise one or more additives conventionally used in primer compositions. Examples are waxes such as polyethylene wax, plasticizers and adhesion promoters. Preferably, the primer composition of the present invention comprises 0 to 10 wt.-%, more preferably 0.1 to 5 wt.-%, based on the weight of the entire primer composition, of at least one additive.

The primer composition of the present invention is preferably used for flexible packagings, labels or shrink sleeves. Many articles such as food articles are stored in flexible packagings, i.e. packagings which are made of a material which shows some flexibility and can thus undergo certain modifications of its shape.

Flexible packagings are widely used in areas like food packaging (e.g., retortable bags, frozen food packaging, refrigerated food packaging, shelf stable food packaging, dry goods packaging, liquid food packaging, fast food wrappers and bags), pharmaceutical packaging (e.g., primary packaging, secondary packaging, booklets and instructions), personal hygiene packaging (e.g. soap packaging, hair care packaging, baby care packaging, feminine care packaging, male care packaging), home care packaging (e.g. detergent packaging, cleaner packaging), agricultural packaging (e.g., herbicide packaging, pest control packaging, fertilizer bags), industrial packaging (e.g. shopping bags, construction wrappers and bags), and pet care packaging (e.g., pet food bags, pet medical packaging, pet hygiene packaging).

Labels and shrink sleeves are widely used for e.g. plastic botties and pouches.

Flexible packagings, labels and shrink sleeves are usually prepared by applying a printed layer, preferably by flexographic or gravure printing, onto one side of the plastic substrate, in order to provide the packaging, label or shrink sleeve with information, design or pictures. This and further conversion to a packaging structure is known in the art.

According to the present invention, first a primer layer is applied onto the packaging substrate, and a printed layer is applied (directly or indirectly via at least one intermediate layer) onto the primer layer. This allows efficient deinking of the packaging substrate, label or shrink sleeve by dissolving the primer layer and thus removing the printed layer that is arranged on said primer layer, from the substrate.

The concept of the present invention is not limited to flexible packagings, but can be used for deinking any substrate. Thus, the present invention is related to a printed product comprising a substrate and a primer layer applied to at least one surface of said substrate, wherein said primer layer is made from a primer composition according to the present invention.

Preferably, said printed product is part of or constitutes a printed article, most preferably a flexible packaging, a label or shrink sleeve.

The substrate of said printed product can be any substrate such as a plastic substrate. Preferably, the substrate is a plastic substrate as conventionally used for flexible packagings. Examples of suitable plastic substrates are polyethylene (PE), polypropylene (PP), polyamide (PA) or polyethylene terephthalate (PET). These substrates may have undergone modification such as metallization or application of a barrier coating like an ethylene-vinylalcohol (EVOH) coating.

On at least one, preferably one surface of said substrate, a primer layer according to the present invention is applied. The primer layer of the present invention can be applied onto the substrate by any conventional coating technique, preferably by flexographic or gravure printing.

Gravure and flexography are the major printing processes for printing packing materials. These processes can be used for printing a large variety of substrates, such as paper, cardboard, or plastic substrates. The gravure and flexographic printing processes are well-known. Reference may be made, for example, to Leach/Pierce (Eds.), The printing ink manual, Blueprint, London, $5^{th}$ ed. 1993, p, 33-53. Also the characteristics of gravure and flexographic inks are known to the skilled man. Reference may be made, for example, to Leach/Pierce (Eds.), The printing ink manual, Blueprint, London, $5^{th}$ ed. 1993, p, 473-598. The respective content of those chapters is incorporated herein by reference.

The primer layer is applied, according to the present invention, onto the substrate in such an amount that a coating weight of 0.2-1.5 g/m², preferably 0.4-1.3 g/m², and especially preferred 0.6-1.0 g/m² is obtained.

The printed product, preferably, printed article and especially preferred a printed article selected from the group consisting of a flexible packaging, a label or a shrink sleeve, of the present invention further comprises a printing ink layer on a side of said primer layer that is not in contact with said substrate.

It is also possible to provide more than one printing ink layer onto the primer layer.

The ink layer(s) applied onto the primer layer may be made from any ink conventionally used in flexible packaging applications. Such an ink can be applied on the substrate by any standard technique, preferably by flexographic or gravure printing.

Preferably, an overprint varnish is applied onto the printing ink layer in order to protect and shield the ink layer from the environment. Any overprint varnish conventionally used in flexible packaging applications may be used. Such overprint varnishes are known and can be applied on the printing ink layer by any standard technique, preferably by flexographic or gravure printing.

According to a preferred embodiment of the present invention, the printing ink layer is not applied directly onto the primer layer. Rather, an additional layer is provided between said primer layer and said printing ink layer. In a preferred embodiment where also an overprint varnish is applied onto the printing ink layer, this results in a structure where the printing ink layer is provided between two additional layers, so that the printing ink layer is encapsulated.

Both the overprint varnish and the additional layer (hereto also referred as encapsulating layer) are resistant to the alkaline deinking conditions applied according to the present invention. As a result, during the deinking process only the primer layer is dissolved, but not the overprint varnish layer and the encapsulating layer. Thus, during deinking the stack of overprint varnish layer, printing ink layer and encapsulating layer remains intact and is completely removed from the substrate. According to this preferred embodiment, any contamination of the deinking medium by possibly released ink is prevented, due to the encapsulation of the printing ink layer between two layers that are resistant to the deinking conditions.

According to a preferred embodiment, the overprint varnish layer and/or the encapsulating layer are made from UV-curing compositions. UV-curing compositions are known in the art and typically comprise monomers and/or oligomers that undergo a radical polymerisation in the presence of a photoinitiator that may absorb UV light, or alternatively using electron beam radiation (in which case a photoinitiator is not necessary).

Using the primer layer of the present invention, a substrate of a printed product, preferably a printed article and especially preferred a printed article selected from the group consisting of a flexible packaging, label or shrink sleeve, can be quickly and efficiently deinked.

Thus, the present invention is also related to a method of deinking a printed article as described herein, comprising a step of treating the printed article in an alkaline aqueous medium so as to dissolve the primer layer that is present on the printed article.

According to the present invention, said treatment step (herein also referred to as deinking) involves treatment of a printed article with an alkaline aqueous medium having a pH value from more than 7 to 13, more preferably 7.5 to 12.5, preferably at an elevated temperature of between 50 to 90° C., preferably 60 to 85° C., within a period of time in the range between 0 to 15 minutes, preferably 1 to 10 minutes, especially preferable 2 to 6 minutes.

Preferably, said alkaline aqueous medium comprises 0.1 to 5 wt. %, preferably 0.5 to 3 wt.-%, based on the entire weight of the aqueous medium, of a base, preferably an alkali or earth alkali hydroxide, such as sodium hydroxide, KOH, or LiOH.

Optionally, the alkaline aqueous medium may contain a surfactant. According to the present invention, any conventionally available surfactant may be used. Preferably, said alkaline aqueous medium comprises 0.1 to 5 wt. %, preferably 0.1 to 1 wt.-%, based on the entire weight of the aqueous medium, of a surfactant.

It has been found that under those conditions the primer layer is dissolved within a very short time. Preferably, said step of treating the printed article is conducted for a time in the range between 1 to 10 min, preferably 2 to 6 min and especially preferred for 2 to 6 min.

The deinking step of the present invention can be carried out in any conventional device. Preferably, said device is equipped with a heating unit and a stirring unit.

According to a preferred embodiment of the present invention, the printed article to be deinked is comminuted into smaller pieces before deinking is carried out. It has been found that smaller pieces can be deinked more rapidly than larger pieces. The suitable size of the pieces to be deinked depends on the nature of the printed article and can be easily optimised by a skilled person.

After deinking, the substrate of the printed article of the present invention is substantially devoid of printing ink, i.e. there should not be any observable remaining printing ink on the substrate. Accordingly, the substrate that has been deinked according to the present invention can be readily recycled by any conventional recycling method in the art, e.g. melt extrusion.

According to a preferred embodiment of the present invention, also the printing ink that has been removed from the substrate during the deinking step according to the present invention can be recycled and reused, for example by separation from the deinking medium and subsequent separation of the pigment(s), e.g. by treatment with suitable solvents and centrifugation. Methods for separating pigments from a printing ink composition are known in the art.

The present invention will now be described below in more detail by reference to non-limiting figures and examples.

Figure 3A:
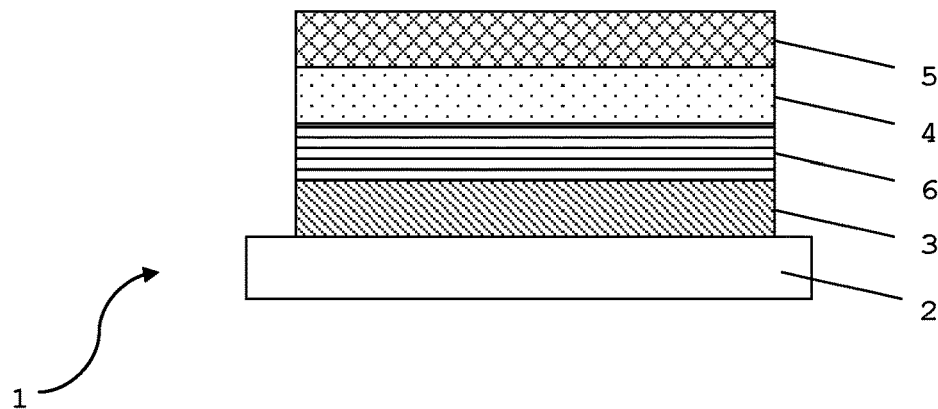
Figure 3B:
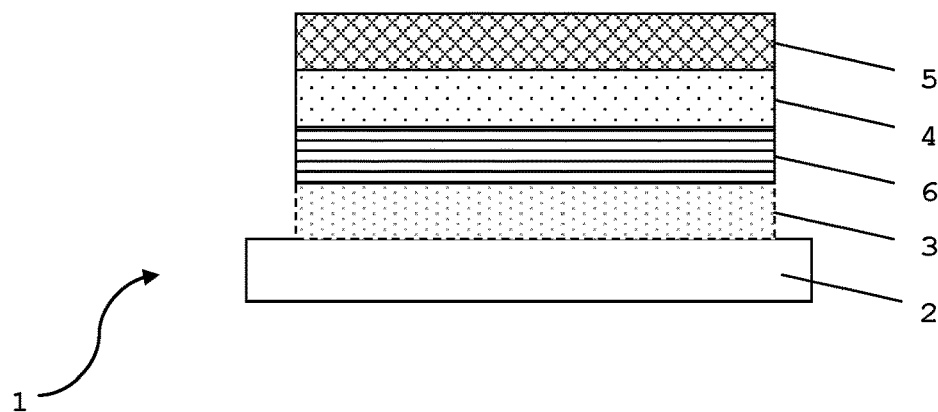
Figure 3C:
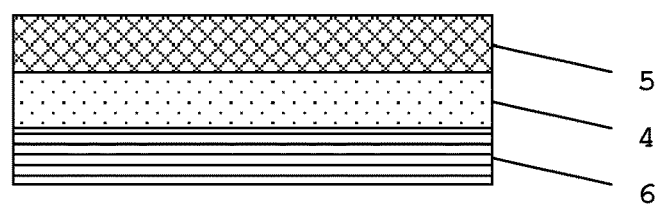
Figure 3C:
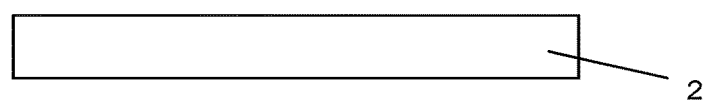

FIGS. 3a-c show an embodiment of the deinking process of the present invention.

Figure 4:
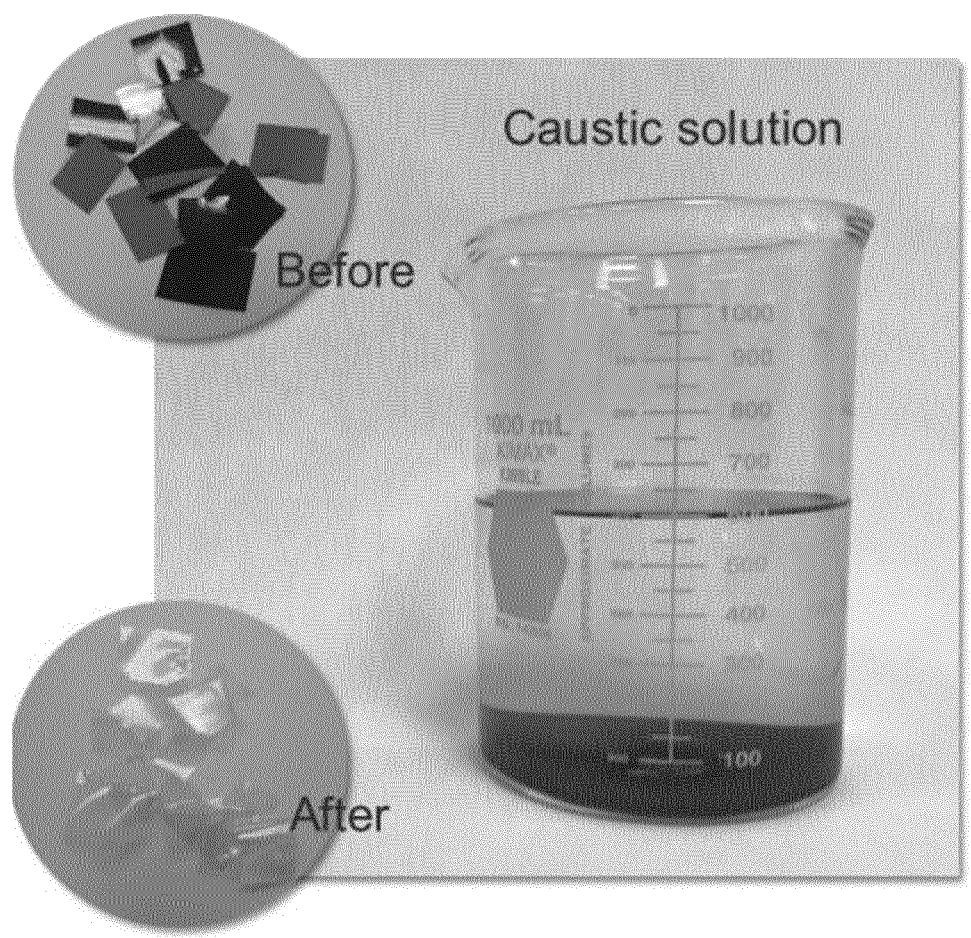

FIG. 4 shows an example of a substrate that has been deinked according to the present invention.

Figure 1:
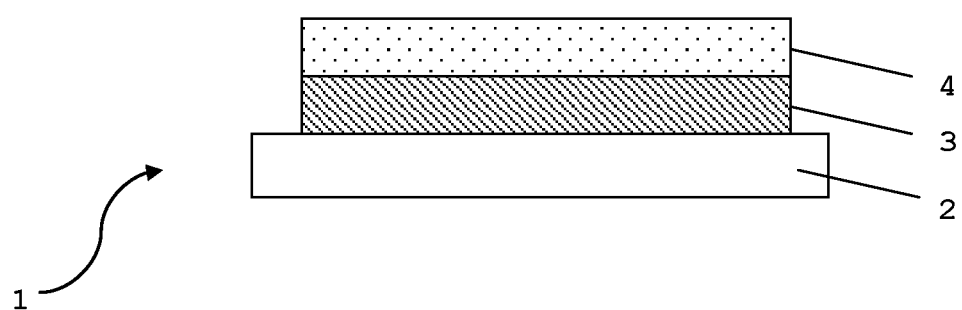
FIG. 1 shows an illustration of a printed product according to a first embodiment of the present invention.

In FIG. 1 a printed product 1 according to a first embodiment of the present invention is shown. The printed product 1 comprises a substrate 2, e.g. a plastic substrate such as a PE, PP or PET. On one surface of said substrate 2, there is applied a primer layer 3 according to the present invention. On one surface of said primer layer 3 that is remote from the substrate 2, there is provided a printing ink layer 4.

Figure 2:
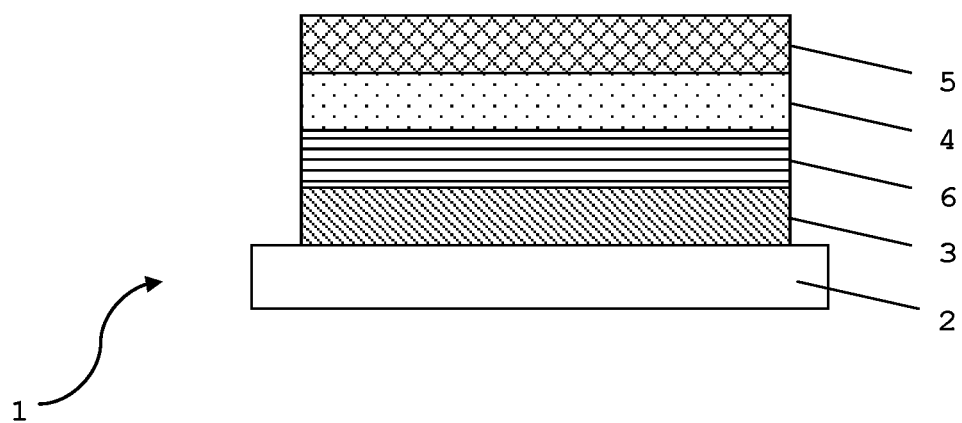
FIG. 2 shows an illustration of a printed product according to a second embodiment of the present invention.

In FIG. 2, a printed product 1 according to a second embodiment of the present invention is shown. Same reference numbers designate same components as in FIG. 1. The printed product 1 according to the second embodiment differs in the additional presence of an overprint varnish layer 5 on top of the printing ink layer 3, and of an encapsulating layer 6 between the primer layer 3 according to the present invention and the printing ink layer 4. Thus, according to the embodiment of FIG. 2, the printing ink layer 4 is encapsulated between the additional layers 5 and 6.

In FIGS. 3a to 3c, the deinking process of the present invention is schematically illustrated. In FIGS. 3a to 3c, as an example a printed product 1 according to the second embodiment of FIG. 2 is shown. However, it is understood that the deking process can be equally applied to a printed product 1 according to FIG. 1, for example.

In FIG. 3a, the printed product 1 before deinking is shown. In FIG. 3b, it is shown that during the deinking step the primer layer 2 becomes dissolved (as illustrated by the dotted boundaries). In FIG. 3c, it is shown that after the deinking step the substrate 1 and the stack of printing ink layer 4 and additional encapsulating layers 5 and 6 are separated from each other, and can be separately recycled.

EXAMPLE 1: PREPARATION OF A FIRST DEINKING PRIMER COMPOSITION

The following components were added together under stirring, so as to result in a deinking primer composition according to the present invention:

| Component | Weight-% |
| --- | --- |
| Nitro varnish | 46.1 |
| PVA varnish | 18.1 |
| Polyurethane resin | 1.8 |
| Epoxidized soybean oil | 0.5 |
| Wax | 2.2 |
| Isopropyl acetate | 31.3 |

The nitro varnish was a 50:50% mixture of nitrocellulose and isopropyl acetate. The PVA (polyvinyl acetate) varnish was a 50:50% mixture of polyvinyl acetate and neopentyl acetate.

EXAMPLE 2: PREPARATION OF A SECOND DEINKING PRIMER COMPOSITION

The following components were added together under stirring, so as to result in a deinking primer composition according to the present invention:

| Component | Weight-% |
| --- | --- |
| 2,6-Di-t-butyl-p-cresol (BHT) | 0.088 |
| Polyvinyl butyral | 14.529 |
| Ethanol | 83.683 |
| Polyvinyl ether resin | 1.705 |

EXAMPLE 3: PREPARATION OF A THIRD DEINKING PRIMER COMPOSITION

The following components were added together under stirring, so as to result in a deinking primer composition according to the present invention:

| Component | Weight-% |
| --- | --- |
| Acrylic polymer emulsion (acid value 40 mg KOH/g) | 85.6 |
| Glycol ether | 5.4 |
| Plasticizer | 2.0 |
| Ammonium hydroxide | 0.2 |
| Water | 1.8 |
| n-propanol | 5.0 |

EXAMPLE 4A-C: PREPARATION OF PRINTED PRODUCT

The deinking primer composition of example 1 was diluted with ethanol to a suitable printing viscosity (26-32 seconds in 3 mm DIN cup). The diluted primer composition was applied onto an untreated PE or PP substrate, using an Erichsen-printing proofer, to obtain a coating weight of 0.2-1.5 g/m$^2$.

On top of the thus applied primer layer, a conventional (one or two-component) flexo or gravure printing ink was applied and allowed to cure in case of the two-component ink, so as to give a product according to example 4a.

The same procedure was repeated with the deinking primer compositions of examples 2 (ex. 4b) and 3 (ex. 4c), respectively.

EXAMPLE 5: DEINKING

Following the APR Critical Issues Guidance Document for Sleeve Label Inks and PET Substrate Bottles test method, an alkaline aqueous medium was prepared by combining 98.7 wt.-% water, 1 wt.-% NaOH and 0.3 wt.-% of a surfactant (Triton X-100).

200 ml of said alkaline aqueous medium were heated to 65° C. or 80° C., 0.8 g of the printed products of examples 4a-c were cut into pieces, put into the caustic solution and stirred. After 15 minutes, the solution was filtered, and the treated cut pieces were washed with water. The test was repeated, but the pieces were filtered off after shorter treatment times.

The results are shown in the following table:

| Substrate/ printing ink | Deinking temperature | Complete deinking duration (min.) | | |
| --- | --- | --- | --- | --- |
| | | Example 4a | Example 4b | Example 4c |
| PE/1K | 65° C. | 2 | 1 | 2 |
| PP/1K | 65° C. | 3 | 2 | 2 |
| PE/1K | 80° C. | <1 | 1 | <1 |

-continued

| Substrate/<br>printing ink | Deinking<br>temperature | Complete deinking duration (min.) | | |
|---|---|---|---|---|
| | | Example 4a | Example 4b | Example 4c |
| PP/1K | 80° C. | <1 | <1 | <1 |
| PE/2K | 65° C. | 7 | | |
| PP/2K | 65° C. | 7 | | |
| PE/2K | 80° C. | 7 | | |
| PP/2K | 80° C. | 3 | | |

1K: 1-component solvent based cyan ink
2K: 2-component solvent based cyan ink (with 5% additional aliphatic hardener)

In addition, it was found that when UV-cured printing inks were present on a primer layer made according to the present invention, deinking could be achieved at 65° C. in 2-3 min.

For comparison, the deinking process was repeated with a printed product where a conventional two-component-flexo or gravure printing ink was applied onto a PET substrate with no primer layer included in said printed product. Also, pure substrate (PET flakes) was treated under the same deinking conditions.

The comparative printed product without primer layer was not deinked within 15 minutes at 80° C. Thus, the printed products according to the present invention could be deinked not only more quickly even at a relatively low temperature of 65° C., but could be deinked under conditions where the comparative printed product was not deinked at all. This is a significant economic and environmental advantage allowing to reuse the material multiple times.

In FIG. 4, the printed product of example 4a before and after the deinking process is shown. It can be seen that the substrate (PET flakes) were completely deinked, resulting in uncolored clear flakes.

The colour of the treated pieces was evaluated with a Gretag Spectroeye and compared with the pure PET flakes (which are absolutely clear without any shade). From the obtained L*-, a*- and b*-values, the ΔE value was calculated by the following known formula (wherein the values with the index 1 are the values of the pure PET flakes and the values with the index 1 are the values of the printed product sample):

$$\Delta E = \sqrt{(L_2^* - L_1^*)^2 + (a_2^* - a_1^*)^2 + (b_2^* - b_1^*)^2}$$

Sufficient deinking is indicated by a ΔE value below 2, more preferably below 1.5. Otherwise, in a subsequent recycling process only shaded PET flakes can be obtained.

For printed products according to example 4a, the following results were obtained:

| | L* | a* | b* | ΔE |
|---|---|---|---|---|
| Pure PET flakes | 91.4 | −0.1 | 1.36 | |
| Printed product of example 4a | | | | |
| Cyan | 89.72 | −0.29 | 1.13 | 1.73 |
| Yellow | 90.31 | −0.38 | 1.87 | 1.24 |
| Magenta | 90.36 | −0.09 | 1.2 | 1.04 |

Thus, the deinking process of the present invention applied on the printed product according to example 4a yielded well deinked pieces in a very short time.

On the other hand, the comparative printed product without primer layer needed much more time for deinking, and even then yielded insufficiently deinked pieces (ΔE higher than 2).

EXAMPLE 6: OVERPRINTABILITY

The printed products according to examples 4a-c were compared with comparative examples 4d-f. In comparative examples 4d-f, instead of a deinking primer composition according to the present invention a primer layer was made from a primer composition comprising a binder component with a high acid value of more than 100 mg KOH/g.

In each case, a conventional (two-component) flexo or gravure printing ink was applied on the respective primer layer and allowed to dry and cure. Overprintability was assessed visually. The results are shown below:

| Primer | Overprintability |
|---|---|
| Example 4a | 5 |
| Example 4b | 4 |
| Example 4c | 4 |
| Example 4d | 1 |
| Example 4e | 1 |
| Example 4f | 1 |

Example 4d: primer with Indurez SR 30 (acid value <250 mg KOH/g)
Example 4e: primer with Joncryl 586 (acid value 110 mg KOH/g)
Example 4f: primer with Joncryl 682 (acid value 238 mg KOH/g)

Assessment of overprintability was made according to the following classification:
1: many printing defects in full tone
2: few printing defects in full tone
3: many printing defects in half tone
4: few printing defects in half tone
5: no printing defects

EXAMPLE 7: WATER (WIPING) RESISTANCE

For the assessment of water (wiping) resistance, examples 4a to 4f were subjected to soaking in water for 2 h and subsequent wiping. Water resistance was assessed visually (by adding some colorant to the primer layer). The results are shown below:

| Primer | Wiping resistance |
|---|---|
| Example 4a | 5 |
| Example 4b | 5 |
| Example 4c | 3 |
| Example 4d | 2 |
| Example 4e | 1 |
| Example 4f | 1 |

Example 4d: primer with Indurez SR 30 (acid value <250 mg KOH/g)
Example 4e: primer with Joncryl 586 (acid value 110 mg KOH/g)
Example 4f: primer with Joncryl 682 (acid value 238 mg KOH/g)

Assessment of water (wiping) resistance was made according to the following classification:
1: complete primer detachment
2: strong primer detachment
3: clearly visible primer detachment
4: slight primer detachment
5: No primer detachment

The invention claimed is:

1. A deinking primer composition for deinking of a substrate, wherein said deinking primer composition comprises a binder component that has a polymeric backbone with pendent hydroxy or carboxy groups that have been esterified or acetalised or ketalised to such an extent that the binder component has an acid value of 0-50 mg KOH/g or a hydroxyl value of 0-600 mg KOH/g, so that a primer layer prepared from said deinking primer composition is dissolvable in an alkaline aqueous medium.

2. The deinking primer composition according to claim 1, wherein said binder component is a polyester or a polyvinyl acetal.

3. The deinking primer composition according to claim 1, wherein said binder component is present in an amount from 5 to 20 wt. %, based on the weight of the entire primer composition.

4. The deinking primer composition according to claim 1, further comprising at least one additional binder component and at least one solvent.

5. A printed product comprising a substrate and a primer layer applied to at least one surface of said substrate, wherein said primer layer is made from a deinking primer composition according to claim 1.

6. The printed product according to claim 5, further comprising a printing ink layer on a side of said primer layer that is not in contact with said substrate.

7. The printed product according to claim 6, wherein said printing ink layer is provided between two additional layers, so that one of said additional layers is arranged between said primer layer and said printing ink layer.

8. A printed article comprising a printed product according to claim 5.

9. The printed article according to claim 8, wherein said printed article is selected from the group consisting of a flexible packing, a label and a shrink sleeve.

10. A method of making the printed article of claim 8, the method comprising applying the deinking primer composition onto a substrate wherein the deinking primer composition comprises a binder component that has a polymeric backbone with pendent hydroxy or carboxy groups that have been esterified or acetalised or ketalised to such an extent that the binder component has an acid value of 0-50 mg KOH/g or a hydroxyl value of 0-600 mg KOH/g, so that a primer layer prepared from said deinking primer composition is dissolvable in an alkaline aqueous medium.

11. A method of deinking a printed article according to claim 8, comprising a step of treating the printed article in an alkaline aqueous medium so as to dissolve the primer layer that is present on the printed article.

12. The method according to claim 11, wherein said alkaline aqueous medium comprises 0.1 to 5 wt. %, based on the entire weight of the aqueous medium, of a base.

13. The method according to claim 11, wherein in said step of treating the printed article said aqueous medium is heated to a temperature in the range from 50 to 90° C.

14. The method according to claim 11, wherein said step of treating the printed article is conducted for a length of time of from 1 to 10 min.

\* \* \* \* \*